Nov. 7, 1933.　　　C. T. PATTERSON ET AL　　　1,934,273
INCUBATOR
Filed June 11, 1930　　　3 Sheets-Sheet 1
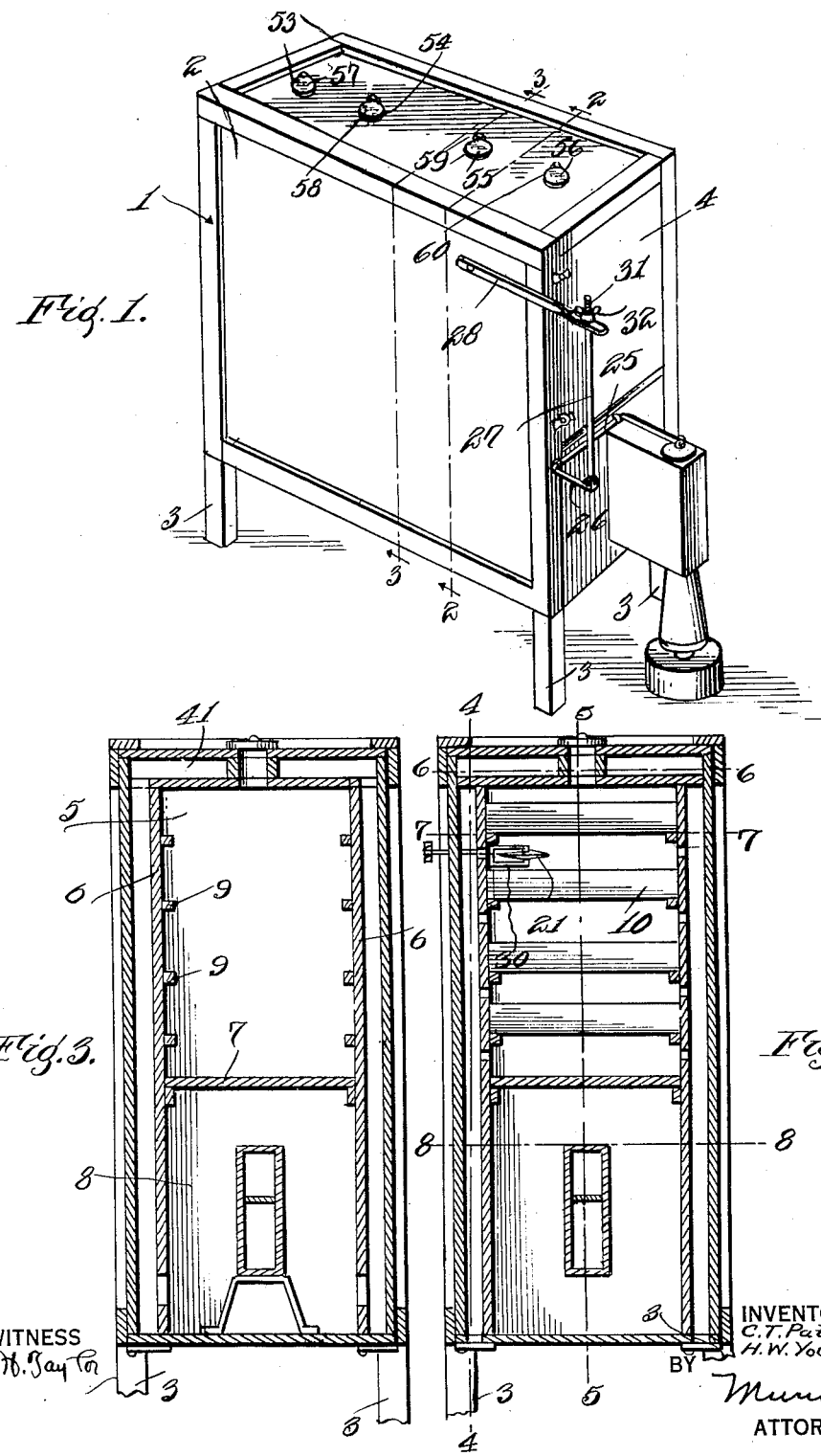

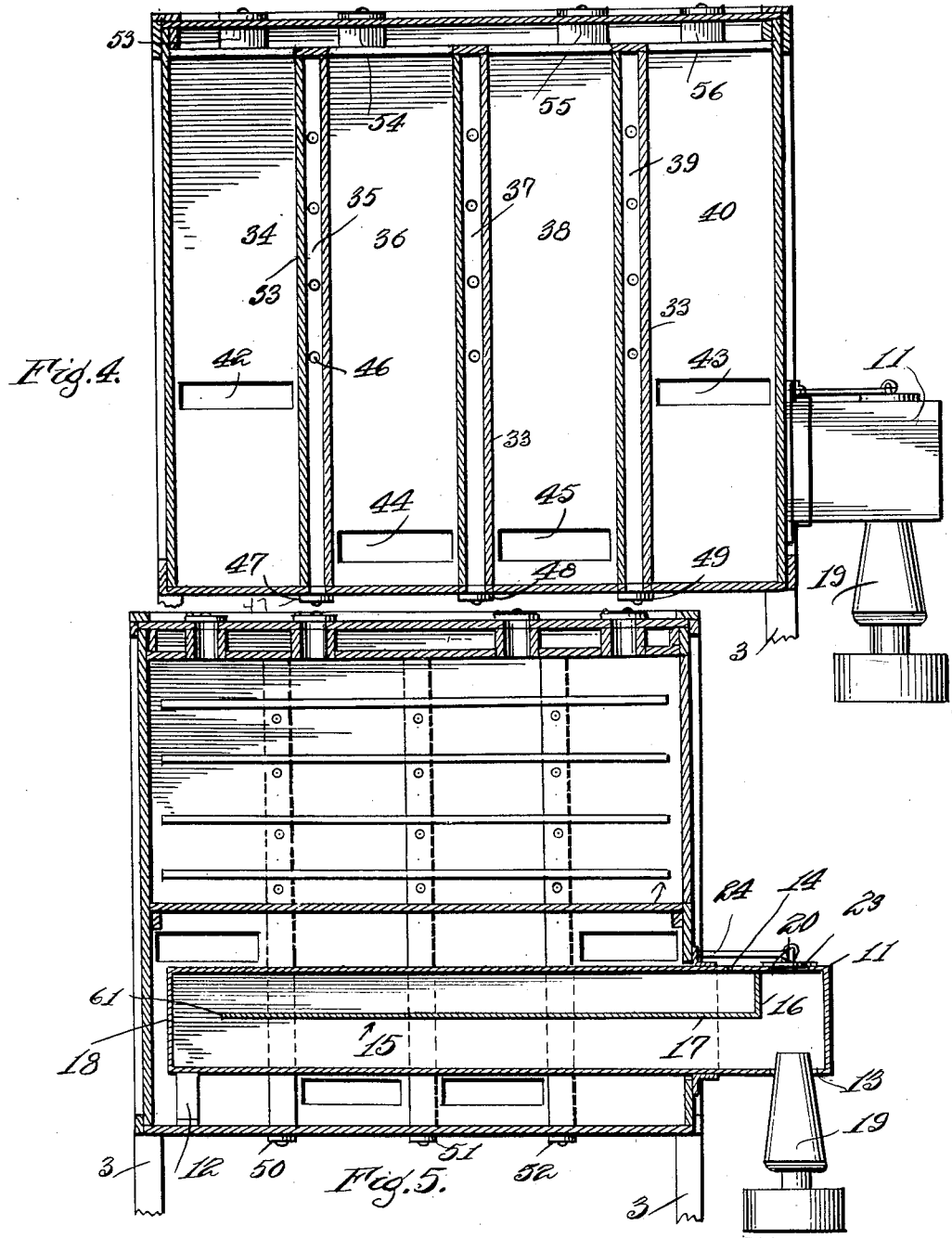

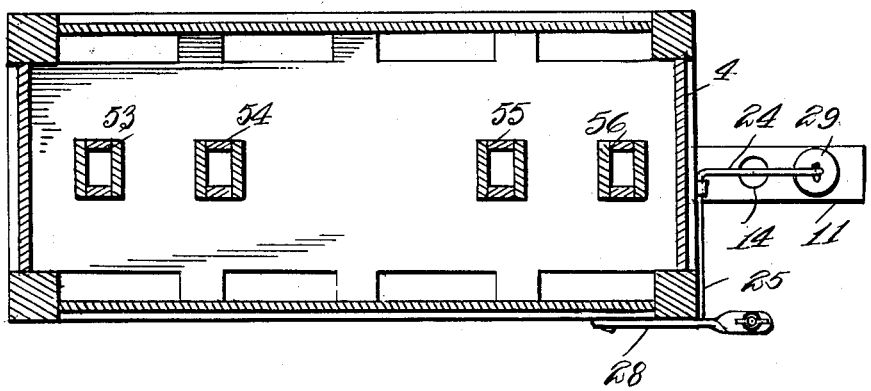
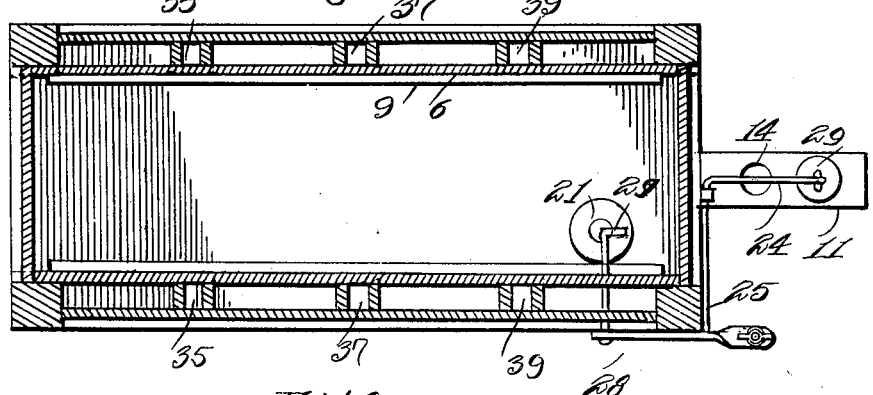
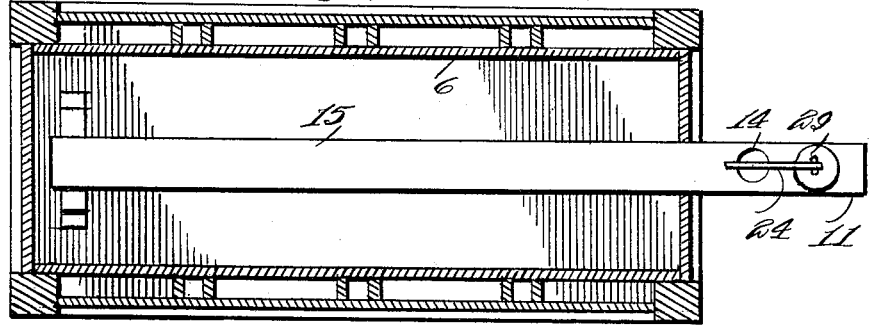

Patented Nov. 7, 1933

1,934,273

UNITED STATES PATENT OFFICE 1,934,273

INCUBATOR

Charley T. Patterson and Homer W. Young, Springfield, Mo.; said Patterson assignor to W. Paul Holland, Springfield, Mo.

Application June 11, 1930. Serial No. 460,490

7 Claims. (Cl. 119—42)

Our invention relates to incubators, more particular to incubators of the so called small or home incubation type, and it consists in the construction, combinations, and arrangements shown and described.

It is generally known that incubators of the home or small type in conventional use are adapted to place the trays which contain the eggs side by side rather than in a vertical arrangement above one another, because of the fact that in incubators of this type it is impossible to secure a uniform heating of eggs on the trays when the same are placed in vertical arrangement above one another without the use of some power means for the circulation of the air. It can be easily understood that placing the trays side by side requires the use of a great amount of floor space, making it extremely inconvenient to the average household to use one of these incubators, due to the lack of sufficient space. It is therefore a primary object of our invention to provide an incubator that will permit the arrangement of the egg-containing trays vertically above one another and at the same time secure successful incubation because of the uniformity of temperature throughout the incubator and about said egg containing trays without the use of power for securing said uniformity of temperature.

A further object of our invention is to provide an even temperature throughout the egg compartment without the use of preheated air passing through said egg compartments, the air passing through said air compartment being fresh atmospheric air which has not been devitalized by preheating.

A further object of our invention is to provide a device of the type described which is simple to manufacture, has few parts, and does not get out of order easily.

Other objects and advantages will appear as the specification proceeds and the invention will be more particularly defined in the appended claims.

The device is illustrated in the accompanying drawings forming a part of this application, in which:

Figure 1 is a perspective view of our device;

Figure 2 is a sectional view on line 2—2 of Figure 1;

Figure 3 is a sectional view on line 3—3 of Figure 1;

Figure 4 is a sectional view on line 4—4 of Figure 2;

Figure 5 is a sectional view, on line 5—5 of Figure 2;

Figure 6 is a sectional view on line 6—6 of Figure 2;

Figure 7 is a sectional view, on line 7—7 of Figure 2; and

Figure 8 is a sectional view, on line 8—8 of Figure 2.

In carrying out our invention we make use of a casing 1 composed of insulated walls 2 and having legs 3 for supporting the same. This casing 1 is provided with a door 4 adjacent the egg compartment 5 therein for permitting insertion and removal of the eggs in said compartment.

Two of the vertical walls and the top of this casing 1 are lined in spaced relation with walls 6 constructed of material adapted to conduct heat therethrough and to radiate heat from the surfaces thereof.

As will be seen from an examination of Figures 2 and 3 these radiating walls 6 are included in two side walls of the air chamber 5 and the top wall. The formation of the egg chamber is completed by the insertion of an insulating plate 7 to form the lower wall or floor thereof and to suitably partition the egg chamber 5 from the heating chamber 8. The egg chamber is provided with slides 9 for the reception of the trays 10 thereon, on which trays the eggs are placed for incubation. As will be seen most clearly from an examination of Figure 3 these trays are arranged in vertical series.

For heating the compartment 8 which heats the egg compartment 5 by means which will be described further on in the specification we provide a member 11 which we term the heating unit and which comprises in this embodiment an elongated chamber having walls constructed of material adapted to conduct heat therethrough as well as to radiate heat from the surfaces thereof. This heating unit 11 as is best shown in Figure 5 is mounted on suitable standards 12 in spaced relation to the walls of the heating chamber 8.

The heating unit is provided with a heat inlet port 13 and a heat outlet port 14 seated in that portion of the heating unit which projects on the outside of the heating chamber 8. The inflowing heated air from port 13 is circulated throughout the unit by means of a suitable deflector or baffle plate 15 positioned therewithin.

This deflector or baffle has a vertical wall 16 and a horizontally extending wall 17 which cooperate to circulate the air. It will be observed that the horizontally extending wall 17 terminates in spaced relation to the end 18 of the heating unit 11, while the vertical wall is positioned adjacent exit 14.

In this embodiment we show the use of a lamp 19 for the injection of heated air into the heating unit. It is understood however that any other means for heating air and injecting the same by means of the reduced specific gravity because of said heating could be utilized if desired.

For controlling the temperature of the heating unit with constant regulation of the heat in the egg chamber we provide a damping means, generally indicated at 20 and adapted for control by thermostatic means shown at 21 and supported in the egg chamber. This damper comprises an aperture 22 positioned in the top wall of the chamber 11 and a cover member 23 for said aperture.

The cover is adapted to be raised out of and lowered into position on the aperture 22 by means of a lever 24 integrally connected for rotation with a shaft 25 which is adapted for rotation by a lever 26 which is actuated from the link 27 and the associated lever 28 and connected rocking lever 29 which cooperates with the thermostat 21. This thermostat may consist of a simple expansible wafer as in usual constructions of this nature and as illustrated in this embodiment. The wafer 21 is secured to the inner wall 6 of the egg chamber by means of brackets 30. The adjustable means, generally indicated at 31 and 27 permits an operator to adjust the thermostatic control for any desired temperature.

This adjustment comprises a simple threaded portion on the link 27 engageable through an aperture in the lever 28 and a nut 32 engageable over said threaded portion and with said lever. This nut is rotatably secured to the lever 28.

For uniformly heating the egg chamber 5 from the heating chamber 8 by means of the heating unit 11 we place between the spaced walls 2 and 6 of the casing and the lining respectively partitions 33 which as will appear from an examination of Figure 4 are placed in series of pairs forming conduits 34, 35, 36, 37, 39 and 40.

The conduits 34, 36, 38 and 40 as appears most clearly from Figure 3 are interconnected in pairs at their upper extremities between the upper radiating wall and the top of the casing through the space 41 between said radiating walls 6 and the top of the casing. The conduits 34 and 40 are provided on their inner walls with ports 42 and 43 respectively, which when the device is set up are positioned in the upper extremity of the heating chamber 8 and it is through these ports that the heated air from the chamber which will rise to the top of the chamber is admitted to the conduits. The conduits 36 and 38 are provided with ports 44 and 45 respectively which are positioned adjacent the base of the heating chamber for the passage of air back into the heating chamber for reheating and repassage through the conduits. The circulation of this heated air through these conduits heats the walls forming said conduits adjacent the egg chamber and causes heat to radiate from said walls into the egg chamber to heat the eggs contained therein.

For securing a circulation of fresh atmospheric air through the egg chamber 5 the conduits 35, 37 and 39 are utilized. These conduits have a series of apertures 46 therein which establish communication between said conduits and the egg chamber. Air is admitted from the outside atmosphere or from any other suitable source by means of the adjustable ports 47, 48 and 49 respectively positioned at the base of said conduits. Ports 47, 48 and 49 inclusive are made adjustable by means of gates 50, 51 and 52 which are pivotally secured adjacent the ports adapting the same to be swung into position over said ports out of engagement with said ports and in intermediate positions leaving said ports partly closed.

The chamber 5 is provided with a number of outlet ports 53, 54, 55 and 56 in the top wall thereof. These ports are formed in the top radiating wall of said chamber 5 and the top insulating wall of the casing member 1 as shown most clearly in section in Figures 2 and 3. They are each equipped with gates 57 to 60 inclusive which are constructed similar to the gates 50 to 52 inclusive and need not be further described.

From the foregoing description, the use and the operation of our device is easily understood. The eggs are placed on the trays 10 with the door 4 open and the trays placed in the egg compartment 5 positioned upon the rails 9 provided therefor.

The lamp 19 is then ignited and placed with its upper extremity projecting through the aperture 13 in the heating unit 11. The egg compartment being now cool the thermostatic control leaves the gate 23 in the position shown in Figure 5, that is, closing the port 22. This causes a circulation of heated air throughout the length of the heating unit 11 below the portion 17 of baffle plate 15 and above the bottom of the heating unit to the space between the extremity 61 of said plate 17 and the end 18 of the heating unit 11. The air then passes along the top of wall 17 of the baffle plate 15 and below the upper wall of the heating unit 11 until it encounters the vertical wall 16 of the baffle and is ejected through the aperture 14 to the outer atmosphere. The heated air circulates in this manner because of the decrease of specific gravity thereof due to the expansion because of the heating.

The circulation of this heated air through the heating unit 11 causes a radiation of heat from the outer walls thereof into the chamber 8. The heated air in this chamber 8 because of the decreased density rises to the top of the chamber and passes through the ports 42 and 43 of the conduits 34 and 40. The air further rises in the conduits 34 and 40 to the space between the upper wall of the egg chamber 5 and the upper wall of the casing member 1 through which space it passes to the conduits 36 and 38 respectively, to the ports 44 and 45 of said conduits and back into the lower portion of the chamber 8 for reheating and reelevation in said chamber for repetition of the cycle of circulation. It can readily be understood that this circulation will take place because of the conduction of the heat in conduits 34 and 40 and the radiation from the inner surfaces of the egg chamber which also form the walls of said conduits 34 and 40 and the conduits 36 and 38. Furthermore heat will be conducted through and radiated from the upper wall of the chamber and the portions of the side walls adjacent the chambers 36 and 38 which loss of heat will cause an increase in the density of the circulating air with increase in the specific gravity thereof to cause said air to descend in the conduits 36 and 38 to the ports 44 and 45 for a repetition of the cycle of operation.

Upon heating the egg chamber 5 to the desired temperature the thermostat 21 comprising the wafer expands to turn the lever 29 upwardly as viewed in Figure 7 for elevation of the cover 23 of port 22 in the heating unit 11. This, of course, permits direct release of the heated air emanating from the chimney of the lamp 19, without passage of the heated air about baffle 15 for heating of the heating unit 11, thereby permitting cooling of said unit.

When the egg chamber 5 has cooled to the desired temperature, the thermostatic means contracts carrying with it downwardly as viewed in Figure 7 the lever 29 which, as heretofore stated, is integrally connected to the wafer 21. This operation of course closes the door 23 on the port 22 thus shutting off the escape of the heated air from the lamp 19 until the same has circulated throughout the heating unit 11 and is ejected therefrom through port 14.

A circulation of cold undevitalized atmospheric air in the egg chamber is secured by means of the conduits 35, 37 and 39, the ports 47 to 49 inclusive of which communicate with the outside atmosphere. The air flows through these ports through the conduits 35, 37 and 39, through the ports 46 communicating with the egg chamber from said conduits 35, 37 and 39 and out of the top of the egg chamber through the ports 53 and 56 inclusive. The adjustable gates 50 to 52 and 57 to 60 inclusive permit the operator to adjust the rate of flow of the air through the egg chamber and the interconnected circulatory system.

The adjustment in the linkage interconnecting the thermostat with the cover 23 permits adjustment of said thermostat control to any desired degree of temperature as will be easily understood.

It is thus seen that we have provided an incubator which provides for the flow of atmospheric air about the eggs which air has not been devitalized by preheating.

It can also be seen that we have provided an incubator, which by means of the uniform heat maintained throughout the egg chamber therein permits without the use of power means, the maintenance of a circulation of air to secure uniform heating thereby allowing the use of a series of egg trays positioned vertically relative to one another, with consequent economy in the use of space, a particularly desirable feature in incubators utilized for home use, where power is not available for the operation of means for circulation of air to secure uniform heating.

We claim:

1. In an incubator, a casing having spaced side and top walls, the casing defining a compartment, a partition dividing said compartment into a heat chamber and a superposed egg chamber, hot and fresh air conduits formed between said casing and said side and top walls, said hot air conduits being in communication with each other at the tops thereof, a heating unit disposed within said heat chamber and extending throughout the major portion thereof, certain of said hot air conduits opening into said heat chamber above said heating unit while certain others of said conduits open into said heat chamber below said heating unit, and said fresh air conduits communicating with the atmosphere and with said egg chamber.

2. In an incubator, a casing having spaced side and top walls, said casing defining a compartment, a partition dividing said compartment into a heat chamber and a superposed egg chamber, conduits formed between said casing and side walls and opening into the space defined by said casing and top wall, an elongated heating unit disposed within said heat chamber and extending throughout the major portion thereof, certain of said conduits opening into said heat chamber above said heating unit while certain others of said conduits open into said heat chamber below said heating unit for creating a circulation of air, fresh air conduits disposed between said casing and side walls, and opening through the bottom of said casing, said last named conduits having apertures forming communication with said egg chamber, and air outlet means formed between said egg chamber and the upper portion of said casing.

3. In an incubator, a casing having spaced side and top walls, the casing defining a compartment, a partition dividing said compartment into a heat chamber and a superposed egg chamber, means for supporting egg trays in superposed relation within said egg chamber, a heating unit disposed within said heat chamber, vertically disposed conduits formed between said casing and said walls and opening into the space defined by said casing and top wall communicating with each other through said space, certain of said conduits opening into said heat chamber near the bottom thereof and certain other of said conduits opening into said heat chamber near the top thereof for creating a circulation of air, fresh air conduits vertically disposed between said casing and side walls, said fresh air conduits having openings near the bottom of said casing forming communication with the atmosphere, means for regulating the amount of fresh air admitted to said fresh air conduits, said last named conduits having apertures forming communication with said egg chamber, said apertures being positioned at various levels of said egg chamber, air outlet means formed between said egg chamber and the upper portion of said casing, and said outlet means having adjustable closures for regulating the amount of air passing through said air outlet means.

4. In an incubator, an egg chamber having heat conducting and radiating walls, a plurality of conduits positioned about said egg chamber and in communication with each other above said egg chamber, means for securing a circulation of heated air through certain of said conduits for the heating of said egg chamber comprising a heat chamber, certain of said conduits communicating with the upper portion of said heat chamber for the injection of heated air therein and certain other of said conduits communicating with the lower portion of said heat chamber for reception of cool air therefrom for re-heating and recirculation and means for heating the air in the heat chamber.

5. In an incubator, an egg chamber, side and top walls disposed about said egg chamber, heating conduits positioned between said side walls and adapted for transmitting heat to said egg chamber, said conduits communicating with each other through the space defined by said top wall, a heating chamber positioned below said egg chamber, and means in said heating chamber for the supply of heat thereto, certain of said conduits having ports communicating with the upper portion of said heating chamber for the reception of heated air therefrom for circulation through said conduits and certain others of the conduits having ports communicating with the lower portion of said heating chamber for the passage of the heated air from said conduits after circulation thereof throughout said conduits for reheating in and recirculation from said heating chamber.

6. In an incubator, a casing having a spaced wall, the casing defining a compartment, a partition dividing said compartment into a heat chamber and superposed egg chamber, partition members between said casing and spaced wall defining conduits, said conduits communicating with each other through the tops thereof and a heating unit disposed within said heat chamber, certain of said conduits opening below said heating unit while certain others of said conduits open above said heating unit, said conduits having communication with the heating chamber.

7. In an incubator, an egg chamber having heat conducting and radiating walls, a plurality of conduits positioned about said egg chamber and in communication with each other above said egg chamber, means for securing a circulation of heated air through said conduits for the heating of said egg chamber comprising a heat chamber, certain of said conduits communicating with the upper portion of said heat chamber for the injection of heated air therein and certain other of said conduits establishing communication with the lower portion of said heat chamber for the reception of cool air therefrom for reheating and recirculation, and fresh air conduits positioned about said egg chamber and opening thereinto at various levels and establishing communication with the atmosphere.

CHARLEY T. PATTERSON.
HOMER W. YOUNG.